Oct. 18, 1960  W. E. STEWART  2,956,334
METHOD OF MAKING ROCKET NOZZLES
Filed June 30, 1958
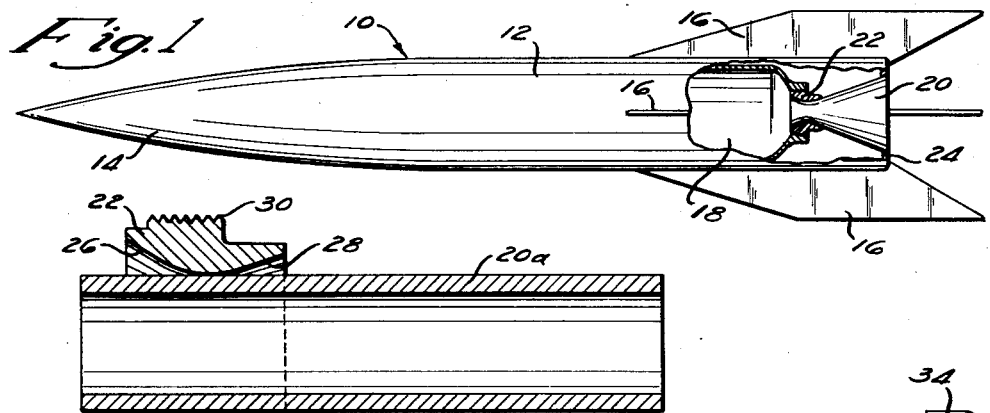
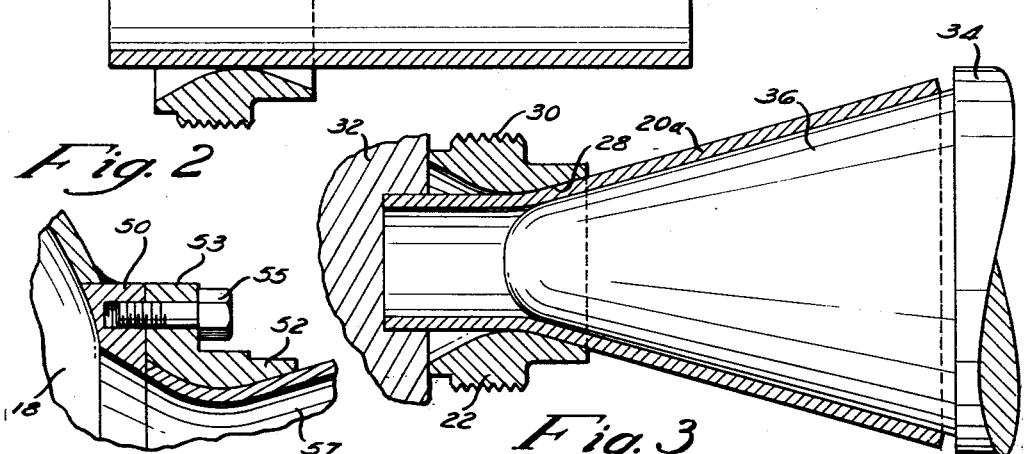
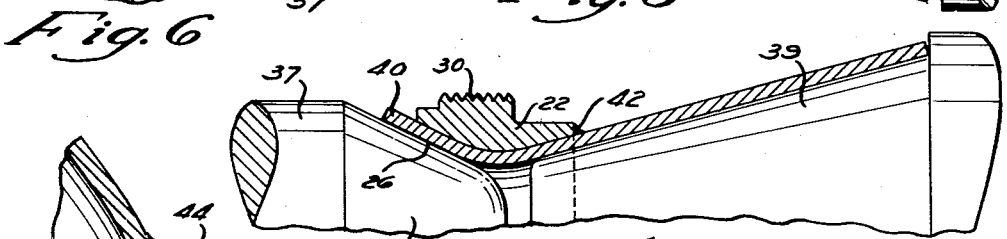
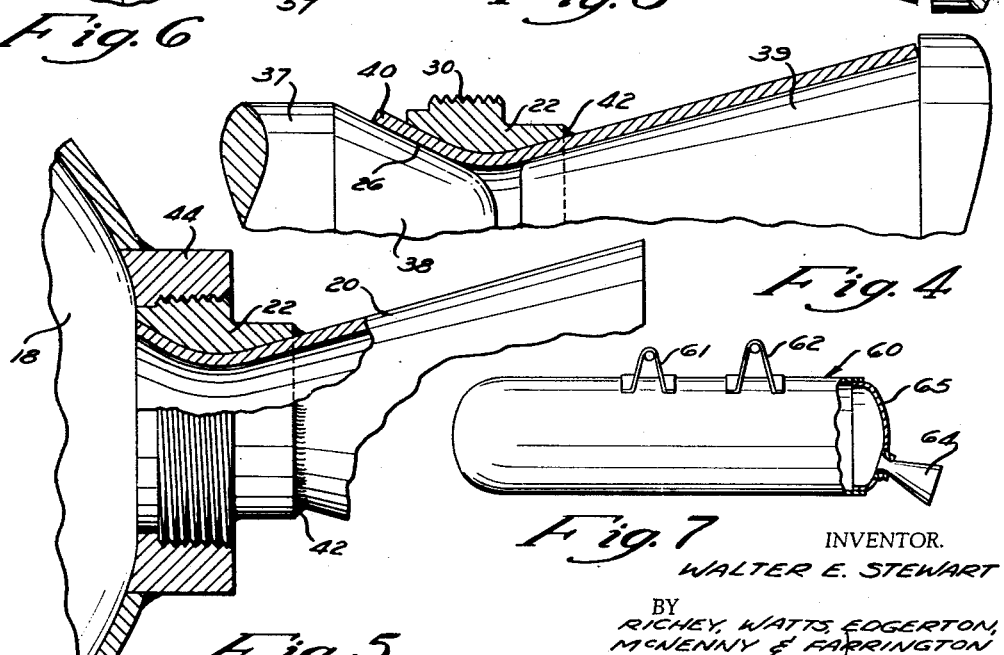
INVENTOR.
WALTER E. STEWART
BY
RICHEY, WATTS, EDGERTON,
McNENNY & FARRINGTON
Watts
ATTORNEYS … # 2,956,334
Patented Oct. 18, 1960

2,956,334
METHOD OF MAKING ROCKET NOZZLES

Walter E. Stewart, Phalanx, Ohio, assignor to The American Welding & Manufacturing Co., Warren, Ohio, a corporation of Ohio Filed June 30, 1958, Ser. No. 745,363

4 Claims. (Cl. 29—157)

This invention relates to a rocket component and more particularly to a method of forming and producing a nozzle facilitating gaseous discharge from a rocket.

According to the construction of one embodiment of a rocket employed in the present defense effort, a nozzle is provided for facilitating discharge of gases at high velocity at the after end of the rocket. Such a nozzle is preferably made as a separate and individually installable member having a venturi-shaped passage. A mounting portion generally made integral with the nozzle proper, is provided for securing the nozzle in place and may be externally threaded along the mounting portion for engaging an internal thread of another portion of the rocket. Alternatively, the nozzle may be mounted by means of bolt holes through a projecting flange of the mounting portion, this flange being located flush with the small end of the venturi or at some distance from that end depending upon the characteristics of the rocket to which the nozzle is to be attached.

In the production of rocket nozzles according to procedures heretofore utilized, it has been the practice to preliminarily form the nozzle by forging, welding or machining operations performed on a solid metal blank to impart to the blank the general venturi shape, and thereafter to finish the forming by machining operations to remove the excesses of the blank remaining after the forging operations and to cut threads or form and drill, or otherwise provide fastening means for a flange. It has been the usual practice to use one piece of material for the entire nozzle, or multiple pieces of metal welded into a fabricated assembly. In either case considerable machining is required.

It is an object of this invention to facilitate rocket nozzle production by a novel and simplified method conservative of time and materials and utilizing simple and inexpensive apparatus. In the production of rocket nozzles according to the method of this invention, the forging steps of the prior art procedure are obviated and the machining operations necessary are minimized. After a simple assembly of the component parts including a tubular member and a fastening collar, the nozzle is formed by forging, forming or swaging operations effective to flare the respective ends of the tube during which operations the collar performs the function of a die and after which operations the collar serves as a fastening means for securing the nozzle to the rocket. The collar may be firmly secured in place by a tack weld with intermittent fusion weld or continuous fusion weld along one continuous edge or a portion of the collar, and is preferably threaded or otherwise formed for attachment to the rocket.

Other and further objects and advantages will appear from a perusal of the following disclosure considered with the accompanying drawings, in which:

Fig. 1 shows a complete projectile-type rocket partially cut away and partially in cross-section to show the disposition therein of a nozzle formed according to the method of this invention;

Fig. 2 shows in cross-section the component parts viz., the tube and collar, of the nozzle assembly of this invention prior to performance of any forming operations thereon;

Fig. 3 shows in cross-section the component parts after the performance of the first forming operation of this invention;

Fig. 4 shows in partial cross-section the component parts of the nozzle after performance of the second forming operation;

Fig. 5 shows in partial cross-section the finished and assembled nozzle secured in place in the rocket;

Fig. 6 is a fragmentary sectional view of an alternative form of an assembly including a bolted flange type of attachment for the nozzle; and Fig. 7 shows a fixed-type rocket equipped with a nozzle made in accordance with this invention.

Referring now to the drawings, 10 represents generally a rocket to which the present invention may be applied, having a body portion 12 streamlined at its forward end to form a nose 14 and stabilizing fins 16 at its rear end for maintaining the rocket on course during high speed flight.

For imparting a propelling thrust to the rocket combustible fuels are carried in containers, not shown, in the body portion 12, and these fuels are mixed and burned in a combustion chamber 18 after which the expanded gaseous products of combustion are discharged from chamber 18 through a nozzle 20. Alternatively, solid propellants requiring no mixing, steam, heated air from a nuclear or other heat source, or compressed gaseous propellants, such as hydrogen, which are capable of great expansion without necessity for mixing with other media, may be used. In accordance with well known physical principles, such discharge imparts a reactive thrust to the rocket.

The nozzle 20 is secured in place by a collar 22 surrounding and tightly engaging a small portion of the nozzle between flared portions thereof and the collar is preferably threadedly, boltedly, or twist-locked secured to a threaded opening in the rear end of the combustion chamber. For maintaining stability of the nozzle and additionally securing the same, an inwardly directed flange 24 at the rearward extreme of the rocket may engage the rearward extreme of the nozzle, or the nozzle may project outwardly over the rearmost extremities of the rocket without support of any kind, except at its point of attachment to the rocket.

As seen clearly in the drawings, the nozzle assembly of the invention comprises a pair of elements including the flared nozzle 20 and the collar 22. In accordance with a feature of this invention, these elements initially assume the shape and proportions shown in Fig. 2, of the drawings. A cylindrical tubular member 20–a of inexpensive tubing material is provided and collar 22, oppositely, axially flared along its interior wall portions 26 and 28 and exteriorly threaded along a raised portion 30 is also provided. The tubing 20–a may be of a type commercially available and collar 22 may be a component easily and readily produced on a screw machine, or other metal turning, metal forming, or metal molding equipment.

In the formation of the nozzle assembly, the collar 22 is positioned about a portion of the tubular member 20–a at a location nearer one end than the other but removed therefrom, as shown in Fig. 2. The collar and tube are held in endwise abutment with a stop 32 to prevent axial movement thereof while a mandrel 34 or swaging tool having a generally conical nose portion 36 angularly complementary to flared portion 28, is inserted into one end of the tube 20–a whereby the tube 20-a is flared outwardly in this end portion. Mandrel 34 is progressively inserted until its end is spaced from the flared portion 28 of collar 22 by approximately the wall thickness of tube 20-a whereby the tube is flared at substantially the same angle as this portion of the collar as shown in Fig. 3. By another method this flaring result may be obtained by use of the well-known metal shaping process called "spinning," wherein the workpiece is rotated and a stationary tool held against its inner surface is used to force the metal outward to conform to the desired shape. It is noted that during such operation, collar 22 acts as a die for backing up the tubing and predetermining its finished shape.

The nozzle is also flared in the other end portion by a swaging tool, by spinning or by a mandrel 37 having a conical nose 38 angularly complementary to flared portion 26 while the nozzle and collar are restrained against endwise movement by a conical member 39 inserted into the first flared portion.

To complete the formation of the nozzle assembly as shown in Fig. 4, the end portion 40 of the nozzle extending beyond the end of the collar is removed by a simple machining operation so that the nozzle and collar are "flush" with each other at this end. In practice this operation may not be necessary since the length of the tubing required can be calculated accurately. To assure fluid tightness of the assembly a weld, or braze, or ceramic seal 42 may be provided at one axial extreme of the collar and engaging the end of the collar and the outer periphery of the nozzle. Fluid tightness of the assembly may also be provided by brazing the entire mating surfaces of the collar and the nozzle. Such a seal may be applied after the first flaring operation to strengthen the assembly for backing up the same during the second flaring operation.

As shown in Fig. 5, the nozzle assembly may be mounted at the rearward end of the combustion chamber by the threaded engagement of the collar 22 and a base member 44 secured in the opening in the combustion chamber. It is to be understood, however, that a rotary bayonet type of lock attachment, or bolted flange type of attachment, may be provided rather than the threaded attachment for a rapid mounting of the nozzle assembly.

A bolted flange type of attachment is illustrated in Fig. 6. The assembly shown in this figure comprises a base member 50 corresponding to base member 44 of Fig. 5 with the exception that screw-threaded recesses are provided at intervals around the periphery of the discharge opening in base member 50 and no screw threads are provided in the discharge aperture itself. Collar 52 similarly corresponds to collar 22 of Fig. 1, but is provided with a flange 53 instead of the screw threads of collar 22 and the flange has openings for registry with the threaded recesses in base member 50. Bolts 55 serve to secure collar 52 and nozzle 57 to base member 50, being inserted into openings in the flange 53 and screwed into the base member. Nozzle 57 produced in accordance with the method of this invention is firmly secured to collar 52 and is fastened tightly although detachably to base member 50 by the bolted flange arrangement just described.

The fixed-type rocket illustrated in Fig. 7 represents a standard type of rocket device designed for attachment to missiles, projectiles or various kinds of air, water, or land-borne vehicles. Thus rocket 60 of Fig. 7 is provided with hangers 61 and 62 for attachment to a vehicle or other device to be powered by the rocket. Rocket 60 is equipped with a nozzle 64 made in accordance with this invention as described above, this nozzle corresponding in all essential respects to nozzle 20 of the rocket of Fig. 1. Rocket 60 also is provided with a base member 65 which corresponds to base member 44 but differs in design from the latter in having its discharge opening directed at an angle to the longitudinal axis of the rocket. Nozzle 64 is secured to base member 65 after the manner of attachment of nozzle 20 to base member 44 as shown in Fig. 5 and described in detail above.

In accordance with the method of this invention that great economical benefits are derived wherein approximately one-fifth the amount of metal is utilized, or one-half to one-fifth the number of pieces of metal are used as compared with prior methods and wherein the cost of machinery that is necessary to perform the present method may be approximately one-half the cost of machinery utilizing forges according to prior methods. In addition, nozzle assemblies as described herein may be produced on automatically operable machines resulting in still further saving in time and labor.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of making a rocket type nozzle which comprises the steps of forming in a metal collar an opening defined by oppositely, axially flared, conical surfaces smoothly connected to one another at their smaller adjacent ends, disposing said collar around a cylindrical metal tube so that the first end thereof projects from the collar, placing the second end of the tube and the adjacent end of the collar against an abutment, and flaring the first end of the tube outwardly into contact with the surrounding conical surface of the collar, removing said abutment, placing an abutment in the flared first end of the tube, and flaring the second end of the tube outwardly into contact with the opposed surface of the collar.

2. The method set forth in claim 1 in which the ends of the tube are flared by forcing conical mandrels thereinto.

3. The method set forth in claim 1 in which the said second end of the tube is flared while the previously flared first end of the tube is supported by an abutment engaging the flared inner surface of the first end of the tube and its end edge.

4. The method set forth in claim 1 in which one end of the collar is connected to the adjacent flared end of the tube by a seal which is fluid tight when the tube is exposed to the products of combustion of burning rocket fuels.

References Cited in the file of this patent

UNITED STATES PATENTS

| | | |
|---|---|---|
| 1,535,235 | Maier | Apr. 28, 1925 |
| 2,044,697 | Huss | June 16, 1936 |
| 2,165,622 | Donohue | July 11, 1939 |
| 2,313,308 | Allen | Mar. 9, 1943 |
| 2,535,470 | Welshman | Dec. 26, 1950 |
| 2,598,191 | Penn | May 27, 1952 |
| 2,779,998 | Bailey | Feb. 5, 1957 |
| 2,846,659 | Hinspater et al. | Aug. 5, 1958 |